Nov. 18, 1930.                O. W. HEISE                1,781,814
                              RETARD GAUGE
                           Filed Nov. 21, 1927
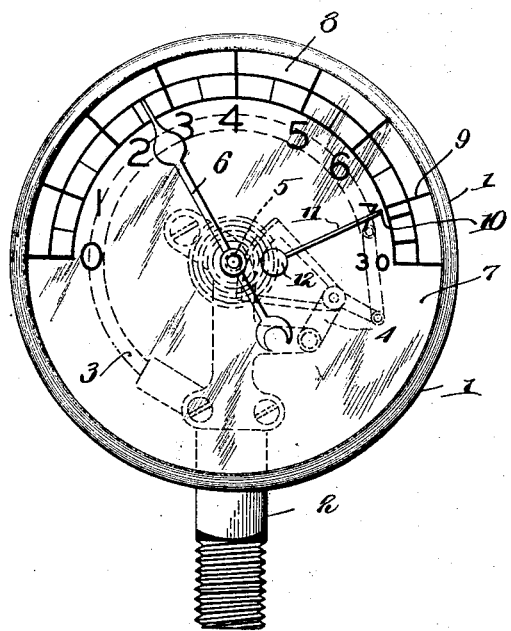
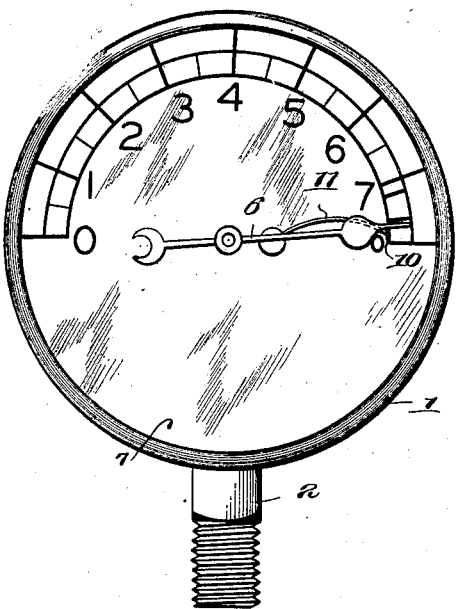
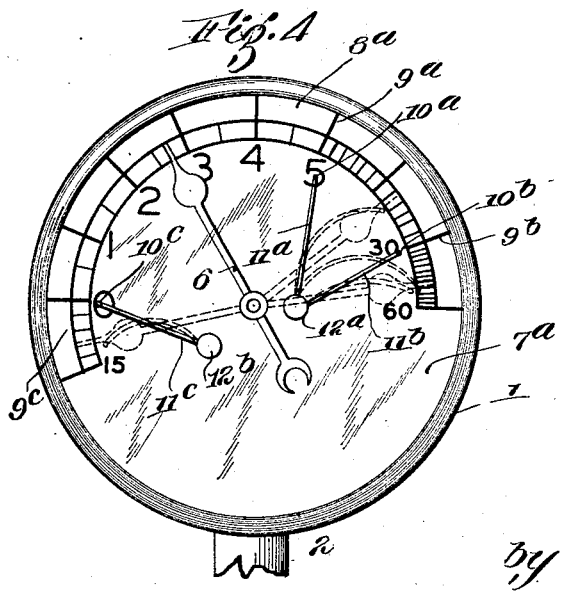
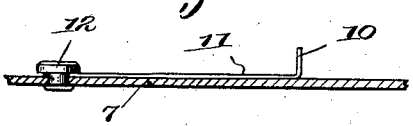
Inventor
Otto W. Heise,
by Roberts Cushman & Woodberry
Attys.

Patented Nov. 18, 1930

1,781,814

UNITED STATES PATENT OFFICE

OTTO W. HEISE, OF BRIDGEPORT, CONNECTICUT, ASSIGNOR TO CONSOLIDATED ASHCROFT HANCOCK COMPANY, INC., OF NEW YORK, N. Y., A CORPORATION OF DELAWARE

RETARD GAUGE

Application filed November 21, 1927. Serial No. 234,567.

This invention pertains to pressure gauges and more particularly to gauges of the retard type, an early example of which is disclosed in the patent to Loepsinger, No. 1,189,706, July 4, 1916.

So far as is known to me, all retard gauges as heretofore constructed have secured the retard effect by interfering with the normal operation of the pressure responsive element (Bourdon tube or the like) or some part of the gauge movement. Since the Bourdon tube and gauge movement are normally concealed behind the dial, it has been necessary, in calibrating such retard gauges, first to remove the index and dial, then approximately to adjust the retard arrangement, replace the dial and index, run the pressure up to the retard point,—observing whether the retard effect, as shown by the index, begins at the proper place, and by repetition of this process reaching the desired accuracy of adjustment. This mode of calibration is slow and expensive, and for various reasons may have to be repeated at intervals during the life of the gauge.

In accordance with the present invention, the above difficulties in calibration are substantially overcome while at the same time the operating strains are distributed uniformly over the entire gauge mechanism. The Bourdon tube and gauge movement are of standard pattern, the retard effect is applicable to existing gauges merely by changing the old dial for a new one, and subsequent change in or adjustment of the retard part may be made without modification of the gauge movement, disassembling the latter, or removing the dial and index.

While a desirable embodiment of the invention is herein illustrated by way of example, it is to be understood that in its broader aspects, the invention may be carried into effect by means other than that specifically disclosed herein. In the drawings:

Fig. 1 is a front elevation of a pressure gauge provided with my improved retard device, showing the index operating under normal pressure conditions, certain parts of the gauge movement being indicated in dotted lines;

Fig. 2 is an elevation of the same gauge, showing the index at the upper or retard part of the scale;

Fig. 3 is a fragmentary section substantially on that plane of the dial defined by the spring abutment arm; and Fig. 4 is an elevation illustrating the retard device as applied to both pressure and vacuum readings and showing an arrangement for obtaining successively greater retardation.

Referring to the drawings, the numeral 1 designates the outer case of a pressure gauge, of substantially usual construction, having the stem 2, the pressure responsive element 3 (which is here indicated as a Bourdon tube), the usual gauge movement 4 which transmits movements of the end of the tube to the index staff 5, the index or pointer 6 secured to the front end of the staff 5, and the dial plate 7 interposed between the index or pointer and the gauge movement.

The dial 7 is provided with graduations forming the scale 8 and as shown these graduations are relatively coarse, indicating small increments of pressure up to the point 9, beyond which the graduations are closer together and indicate greater increments of pressure.

At a point substantially radial with respect to the center of the gauge and the line 9, I arrange a yielding abutment 10 disposed in the path of the index 6. This abutment 10 is preferably carried by or forms an integral end portion of a spring finger 11, whose opposite end is fixedly secured to the dial 7 by means of a stud or rivet 12. While this form of yielding abutment is very simple, durable and reliable, I contemplate that other forms of yielding abutment may be substituted therefor within the scope of the invention.

As the pressure rises, the index 6 moves away from the zero point and along the scale 8 in accordance with the normal change in configuration of the tube 3, but when the index needle or pointer comes into contact with the forwardly projecting abutment member 10, its further movement is opposed by the latter and subsequent increase in pressure is thus measured by the opposed action of the Bourdon tube and the spring finger 11. The movement of the needle or index is thus slowed down so that a much greater increase in pressure is necessary to produce a corresponding increment of movement of the needle than is true before the needle comes into contact with the abutment 10. Thus, in accordance with usual practice in retard gauges, a small portion of the scale adjacent its upper end may be used for indicating a long range of pressures, while the lower part of the scale is open and clearly indicates small variations in pressure.

It should be noted that the abutment 10 is supported solely by the dial and has no direct connection with the Bourdon tube or gauge movement, so that it may be applied to existing gauges merely by riveting the resilient arm 11 to the existing gauge dial or by substituting a new dial having such a spring finger attached to it. In attaching the spring finger to the dial the only care necessary is to cause the abutment member 10 to lie radially opposite the point 9 in the scale at which the retard action is intended to begin, and even after the spring finger has been secured to the dial it may be adjusted to this position by bending the arm 11 slightly in the necessary direction by use of a pair of pliers or other suitable tool.

Not only is this new retard arrangement advantageous from the standpoint of ease of application and adjustment, but it also imposes less strain upon the gauge mechanism than the usual type of retard device, since it acts through the long leverage afforded by the pointers and the pinion and sector of the gauge movement, to oppose the action of the Bourdon tube, and the strains are thus distributed equally throughout the mechanism.

In Fig. 4 I have shown a modified structure in which the gauge case 1 having the usual interior mechanism is provided with the index 6 and the dial plate 7ª. This dial plate has a scale 8ª having coarse graduations extending from the zero point to the line 9ª. From this point to the point 9ᵇ the graduations are finer, corresponding to greater increments of pressure, and from the point 9ᵇ to the upper end of the scale the graduations are still finer corresponding to even larger increments of pressure. At the opposite side of the zero point of the scale other graduations are provided as indicated at 9ᶜ, such graduations being arranged to show vacuum pressures.

In this instance the stud or rivet 12ª carries two spring fingers 11ª and 11ᵇ, respectively, provided at their ends with forwardly directed abutments 10ª and 10ᵇ. The abutment 10ª normally stands opposite the line 9ª, while the abutment 10ᵇ normally stands opposite the line 9ᵇ. The dial also carries a second rivet or stud 12ᵇ to which one end of a spring finger 11ᶜ is attached. This spring finger is provided with a forwardly projecting abutment element 10ᶜ normally disposed opposite the zero point of the scale.

As the pressure rises the pointer 6 moves in a clockwise direction over the coarser graduated part of the scale until it engages the abutment 10ª, whereupon its motion is retarded, and as the pressure increases the pointer indicates relatively large increments of pressure along the portion of the scale between the lines 9ª and 9ᵇ. When the pointer reaches the line 9ᵇ it engages the abutment 10ᵇ which adds its yielding resistance to that of the abutment 10ª, thus further slowing down the movement of the needle as the latter travels over the upper end of the scale.

On the other hand, if the pressure drops below the zero point, the needle engages the yielding abutment 10ᶜ and in traveling over the portion 9ᶜ of the scale indicates vacuum pressures.

While I have here shown the abutment member as engaging the index end of the pointer, it is obvious that it might be arranged to engage the opposite end of the pointer or some other element moving with the index staff. Furthermore, while this abutment is shown as carried by a substantially straight spring arm, I contemplate that the shape of this spring arm may be varied in accordance with circumstances and that if desired a coiled type of spring may be employed, instead of the straight spring arm shown. I also contemplate that the abutment element may be supported at a point outside of the scale and by some part of the gauge casing, rather than the dial, if circumstances should warrant doing so, although I regard it as desirable to have this abutment in front of the dial and for the sake of convenience carried by the latter.

I claim:

1. A retard pressure gauge having a pressure responsive element, a movable index, connections for transmitting movement of the pressure responsive element to the index, and yielding means cooperable directly with the index, after a predetermined movement thereof for retarding further movement of the index.

2. A retard pressure gauge having a pressure responsive element, a movable index, connections for transmitting movement of the pressure responsive element to the index, and a yielding element disposed in the path of the index and engageable by the index after a predetermined movement of the latter, thereby to retard further movement of the index.

3. A retard pressure gauge having a pressure responsive element, a movable index, connections for transmitting movement of the pressure responsive element to the index, and a spring finger disposed in the path of the index and engageable by the index after a predetermined movement of the latter for retarding further movement of the index.

4. A retard gauge having a graduated dial, a movable index in front of the dial and cooperating with the latter to indicate pressure, an index staff supporting the index and passing rearwardly through the dial, a pressure responsive element behind the dial, connections, also behind the dial, for transmitting movement from the pressure responsive element to the index staff, and means disposed in front of the dial for retarding the index after a predetermined pressure is reached.

5. A retard pressure gauge having a Bourdon tube, a gauge movement, a dial in front of the tube and gauge movement, a movable index in front of the dial, said index receiving its motion from the gauge movement, and means in front of the dial for retarding the rate of movement of the index when a predetermined pressure is reached.

6. A retard pressure gauge having a Bourdon tube, a dial, a moveable index in front of the dial, a gauge movement behind the dial for transmitting movements of the tube to the index, and a yielding abutment in front of the dial engageable by the index, when a predetermined pressure is reached, for retarding the further movement of the index.

7. A retard pressure gauge having a pressure responsive element, a dial, a movable index, means for transmitting movement from the pressure responsive element to the index, and means carried by the dial and engageable by the index for retarding further movement of the index when a predetermined pressure has been reached.

8. A retard pressure gauge having a pressure responsive element, a dial, a movable index, means for transmitting movement from the pressure responsive element to the index, and a spring member secured at one end to the dial and having its free end disposed in the path of movement of the index, said spring member permitting substantial further movement of the index after engagement therewith.

9. A retard pressure gauge having a pressure responsive element, a dial, a movable index, means for transmitting movement from the pressure responsive element to the index, and an elongate spring finger fixedly secured at one end to the dial near the center of the latter, the opposite end of said finger projecting forwardly and into the path of the index.

10. A dial for pressure gauges having a scale thereon, said scale having a portion with relatively coarse graduations and a portion with relatively fine graduations, and a yielding abutment normally disposed at the junction of the coarse and fine graduations and adapted to engage an index movable over the scale.

11. A dial for pressure gauges having a scale thereon, said scale having differently graduated portions, and a spring finger secured to the dial with a portion thereof disposed at the junction of said differently graduated portions and adapted to be engaged by an index moving over the scale.

12. A pressure gauge having a pressure responsive element, a movable index, connections for transmitting movement of the pressure responsive element to the index, and means successively engageable by the index at predetermined pressures respectively, for additively opposing resistance for retarding further movement of the index.

13. A pressure gauge having a pressure responsive element, a movable index, connections for transmitting movement of the pressure responsive element to the index, and a plurality of yielding abutment members successively engageable with the index at predetermined pressures respectively, for opposing resistance to retard further movement of the index.

14. A pressure gauge having a pressure responsive element, a movable index, connections for transmitting movement of the pressure responsive element to the index, and a pair of yielding abutment members with one of which the index engages when a predetermined point in the movement of the index in one direction has been reached, and with the other of which the index engages when a predetermined point in the movement of the index in the opposite direction has been reached, thereby retarding the index after a predetermined movement in either direction.

Signed by me at Bridgeport, Connecticut, this eighth day of November, 1927.

OTTO W. HEISE.